United States Patent
Liu et al.

(10) Patent No.: US 11,343,448 B2
(45) Date of Patent: May 24, 2022

(54) METHOD OF OPERATING AN HDR PIXEL CIRCUIT ACHIEVING HIGH PRECISION

(71) Applicant: PixArt Imaging Incorporation, Hsinchu (TW)

(72) Inventors: Ren-Chieh Liu, Hsinchu (TW); Wen-Cheng Yen, Hsinchu (TW); Hsin-Hung Shen, Hsinchu (TW)

(73) Assignee: PIXART IMAGING INCORPORATION, Hsinchu (TW)

( * ) Notice: Subject to any disclaimer, the term of this patent is extended or adjusted under 35 U.S.C. 154(b) by 78 days.

(21) Appl. No.: 16/867,539

(22) Filed: May 5, 2020

(65) Prior Publication Data

US 2021/0352231 A1 Nov. 11, 2021

(51) Int. Cl.
*H04N 5/355* (2011.01)

(52) U.S. Cl.
CPC ....... *H04N 5/3559* (2013.01); *H04N 5/35509* (2013.01)

(58) Field of Classification Search
None
See application file for complete search history.

(56) References Cited

U.S. PATENT DOCUMENTS

| | | | |
|---|---|---|---|
| 6,600,471 B2 | 7/2003 | Lee et al. | |
| 6,777,662 B2 | 8/2004 | Drowley et al. | |
| 2005/0083421 A1 | 4/2005 | Berezin et al. | |
| 2009/0153715 A1* | 6/2009 | Deschamps | H04N 5/35581 348/308 |
| 2011/0013064 A1* | 1/2011 | Lahav | H04N 5/335 348/296 |
| 2014/0253768 A1* | 9/2014 | Li | H01L 27/14603 348/294 |
| 2015/0070553 A1* | 3/2015 | Lee | H01L 27/14638 348/308 |
| 2016/0301884 A1* | 10/2016 | Seliuchenko | H04N 5/35527 |
| 2017/0324917 A1* | 11/2017 | Mlinar | H04N 5/369 |
| 2019/0379848 A1* | 12/2019 | Berkovich | H04N 5/37455 |
| 2020/0145593 A1* | 5/2020 | Gao | H04N 5/35527 |

* cited by examiner

*Primary Examiner* — Cynthia Segura
(74) *Attorney, Agent, or Firm* — Tung & Associates

(57) ABSTRACT

A method of operating an HDR pixel circuit includes: establishing a calibration full-well capacity of a photodiode according to a first predetermined voltage level; over-charging both the photodiode and a floating diffusion node; dissipating the charges of the floating diffusion node and the charges on the photodiode so that the charges on the photodiode are substantially equal to the calibration full-well capacity; transferring the charges on the photodiode to the floating diffusion node; and sensing a voltage on the floating diffusion node to generate a calibration signal related to the calibration full-well capacity.

16 Claims, 16 Drawing Sheets

METHOD OF OPERATING AN HDR PIXEL CIRCUIT ACHIEVING HIGH PRECISION

BACKGROUND OF THE INVENTION

Field of Invention

The present invention relates to a method of operating a pixel circuit. Particularly it relates to a method of operating a pixel circuit to achieve high precision with extended dynamic range.

Description of Related Art

Relevant prior patents are U.S. Pat. No. 6,600,471B2, U.S. Pat. No. 6,777,662B2, US2005/0083421A1, which solve the issue by a different approach from the present invention.

FIG. 1 shows a typical pixel circuit (100) of a MOS imager circuit. The pixel circuit (100) includes a photodiode PD, a transfer transistor MTG, and a buffer transistor MSF. The photodiode PD is configured to operably accumulate charges generated by a photocurrent of the photodiode during an integration period. The integration period for example is a time period during which the photodiode PD is exposed by a shutter to capture an image. The transfer transistor MTG is controlled by a transfer signal TG. A first electrode of the transfer transistor MTG is coupled to the photodiode PD and a second electrode of the transfer transistor MTG is coupled to a floating diffusion node FD. Typically, the second electrode of the transfer transistor MTG is formed as a capacitor (e.g. Cfd as shown in FIG. 1) by a P-N junction which is actually a diffusion region of the transfer transistor MTG. The reset transistor MR is controlled by a reset signal RST, wherein a first electrode of the reset transistor MR is coupled to a reset voltage Vrst and a second electrode of the reset transistor MR is coupled to the floating diffusion node FD. The buffer transistor MSF is configured to operably sense a voltage Vfd on the floating diffusion node FD. More specifically, in one embodiment, as shown in FIG. 1, the gate of the buffer transistor MSF is coupled to the floating diffusion node FD. In one embodiment, the buffer transistor MSF is configured as a source follower for sensing the voltage Vfd on the floating diffusion node FD.

During the integration period, the charges accumulated on the photodiode PD are proportional to the illumination intensity. After the integration period, the charges accumulated on the photodiode PD are transferred to the floating nod FD and the illumination intensity can be calculate by sensing the voltage VFD on the floating diffusion node FD with a voltage-to-light (or charges-to-light) transfer function.

A variety of techniques have been proposed for achieving high dynamic range (HDR) of a MOS imager circuit. In one particularly effective technique, the voltage-to-light transfer function of the imager circuit is configured to be a nonlinear function of illumination intensity.

FIG. 2 shows a potential diagram corresponding to plural levels of the transfer signal TG of an HDR pixel circuit according to the present invention. As shown in FIG. 2, when the transfer signal TG is set to level V1, V2 and a low level (Voff), the corresponding calibration full-well capacities (FWC) are Q1, Q2, and Qoff. Note that in one embodiment, Qoff is the maximum possible FWC of the pixel circuit 100. When the transfer signal TG is set to a high level (Von), all the charges on the photodiode PD is transferred to the floating diffusion node FD through the transfer transistor MTG, as shown in the potential diagram. Different calibration full-well capacities correspond to different slopes of the voltage-to-light transfer function. Therefore, by setting plural levels of the transfer signal TG during different portions of an integration period can yield a non-linear voltage-to-light transfer function. By sensing the voltage Vfd on the floating diffusion node FD during plural portions of the integration period corresponding to different levels of the transfer signal TG to calculate the intensity of the illumination, high dynamic range imaging can be achieved. In one embodiment, the predetermined voltage levels V1 and V2 of the transfer signal TG are higher than the low level (i.e. Voff) and are lower than the high level (i.e. Von).

FIG. 3A shows a timing diagram of employing plural calibration full-well capacities of an HDR imager circuit to yield a typical non-linear voltage-to-light transfer function. FIG. 3B shows a non-linear voltage-to-light (or charges Q-to-light) transfer function corresponding to FIG. 3A. More specifically, referring to FIG. 3A, for example, during the first portion of the integration period (P1), the transfer signal is set to a first predetermined voltage level V1 and the corresponding calibration full-well capacity is Q1, and during the second portion of the integration period (P2), the transfer signal is set to Voff and the corresponding calibration full-well capacity is Qoff. As shown in FIG. 3A, for simplicity, the complete integration period (P1+P2) is normalized to 1, and P1 and P2 indicate the ratios of the first and the second portions of the integration period to the complete integration period. The calibration full-well capacity Qoff corresponding to Voff is normalized to 1.

As shown in FIG. 3A, when the illumination is low, the intensity of the illumination can be determined by:

$$Qlo/1 = Qlo \qquad \text{Eq. 1}$$

When the illumination is high, the intensity of the illumination can be determined by:

$$(Qhi - Q1)/(1 - P1) \qquad \text{Eq. 2}$$

Note that the boundary charges level separating high or low illumination in the case is:

$$Qbound = Q1/P1 \qquad \text{Eq. 3}$$

The dynamic range is extended by a factor DRext which is determined by:

$$DRext = (1 - Q1)/(1 - P1) \qquad \text{Eq. 4}$$

Referring to FIG. 3B, in this example, Q1 is configured to be for example ½ and P1 is configured to be for example ⅞, which yields an dynamic range extension DRext which is equal to 4 with a non-linear voltage-to-light transfer function as shown in FIG. 3B.

However, pixel-to-pixel variation of the photodiodes of different pixel circuits in an imager circuit array can cause different levels of calibration full-well capacities corresponding to the same level (e.g. V1) of the transfer signal TG, which leads to higher noise level and lower precision for image sensing. FIG. 4A shows an ideal and a non-ideal calibration full-well capacities with the same transfer signal. FIG. 4B shows an ideal and a non-ideal voltage-to-light transfer functions. As the solid lines show in FIG. 4A and FIG. 4B, the ideal calibration full-well capacity Q1 of the photodiode PD is expected to be ½ and the turning point of the non-linear voltage-to-light transfer function is ⅘. However as the dashed lines show in FIG. 4A and FIG. 4B, the non-ideal calibration full-well capacity Q1' of the photodiode PD deviates from the ideal value of ½ and the turning point Qbound' of the non-linear voltage-to-light transfer function deviates from the ideal value of 4/7.

The present invention provides a method of calibrating the calibration full-well capacities of each pixel circuit to compensate the pixel-to-pixel variation of the photodiodes.

SUMMARY OF THE INVENTION

From one perspective, the present invention provides a method of operating an HDR pixel circuit, wherein the pixel circuit includes: a photodiode, configured to operably accumulate charges generated by a photocurrent of the photodiode during an integration period; a transfer transistor, controlled by a transfer signal, wherein a first electrode of the transfer transistor is coupled to the photodiode and a second electrode of the transfer transistor is coupled to a floating diffusion node; a reset transistor, controlled by a reset signal, wherein a first electrode of the reset transistor is coupled to a reset voltage and a second electrode of the reset transistor is coupled to the floating diffusion node; and a buffer transistor, configured to operably sense a voltage on the floating diffusion node; the method comprising performing one of the following combinations of steps during a calibration period: (1) S100: establishing a calibration full-well capacity of the photodiode according to a first predetermined voltage level; S200: over-charging both the photodiode and the floating diffusion node; S300: dissipating at least a portion of the charges of the floating diffusion node and at least a portion of the charges on the photodiode so that the charges on the photodiode are substantially equal to the calibration full-well capacity; S400: transferring the charges on the photodiode to the floating diffusion node; and S500: sensing the voltage on the floating diffusion node to generate a calibration signal related to the calibration full-well capacity; or (2) S100': over-charging both the photodiode and the floating diffusion node; S200': establishing a calibration full-well capacity of the photodiode according to a first predetermined voltage level; S300: dissipating at least a portion of the charges of the floating diffusion node and at least a portion of the charges on the photodiode so that the charges on the photodiode are substantially equal to the calibration full-well capacity; S400: transferring the charges on the photodiode to the floating diffusion node; and S500: sensing the voltage on the floating diffusion node to generate a calibration signal related to the calibration full-well capacity.

In one embodiment, in combination (1) the step S100 includes: setting the transfer signal to the first predetermined voltage level to establish the calibration full-well capacity of the photodiode; the step S200 includes: setting the reset voltage to a low level to over-accumulate charges on both the photodiode and the floating diffusion node, wherein the charges over-accumulated on the photodiode are higher than the calibration full-well capacity; the step S300 includes: setting the reset voltage to a high level to dissipate the charges of the floating diffusion node and the charges on the photodiode, so that the charges on the photodiode are substantially equal to the calibration full-well capacity, and thereafter setting the reset signal to a low level to turn off the reset transistor; the step S400 includes: setting the transfer signal to a high level to transfer the charges on the photodiode to the floating diffusion node through the transfer transistor; and the step S500 includes: sensing the voltage on the floating diffusion node by the buffer transistor to generate the calibration signal related to the calibration full-well capacity; or in combination (2) the step S100' includes: setting the transfer signal to a high level and setting the reset voltage to a low level to over-accumulate charges on both the photodiode and the floating diffusion node, wherein the charges over-accumulated on the photodiode are higher than the calibration full-well capacity of the photodiode; the step S200' includes: setting the transfer signal to the first predetermined voltage level to establish the calibration full-well capacity; the step S300 includes: setting the reset voltage to a high level to dissipate the charges of the floating diffusion node and the charges on the photodiode, so that the charges on the photodiode are substantially equal to the calibration full-well capacity, and thereafter setting the reset signal to a low level to turn off the reset transistor so that the floating diffusion node is configured to a reset state; the step S400 includes: setting the transfer signal to a high level to transfer the charges on the photodiode to the floating diffusion node through the transfer transistor; and the step S500 includes: sensing the voltage on the floating diffusion node by the buffer transistor to generate a well-capacity signal related to the calibration full-well capacity, and generating a calibration signal according to the well-capacity signal.

In one embodiment, the method further comprises: S600: generating a raw image signal by the pixel circuit by setting the transfer signal to the first predetermined voltage level during a first portion of the integration period and to a second voltage level during a second portion of the integration period; and S700: generating a calibrated image signal according to the raw image signal and the calibration signal.

In one embodiment, the method further comprises: S340: after the step S300 and before the step S400, sensing the voltage on the floating diffusion node by the buffer transistor to generate a reference signal related to the reset state of the floating diffusion node; wherein the step S500 further includes: generating the calibration signal further according to the reference signal.

In one embodiment, the method further comprises: S350: before S400, setting the transfer signal to a low level.

In one embodiment, the method further comprises: performing the steps according to the listed order of the steps.

In one embodiment, in the step S400, the high level is high to an extent which is sufficient to transfer all the charges on the photodiode to the floating diffusion node through the transfer transistor.

In one embodiment, the first predetermined voltage level of the transfer signal is higher than the low level of the transfer signal and is lower than the high level of the transfer signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 5A:
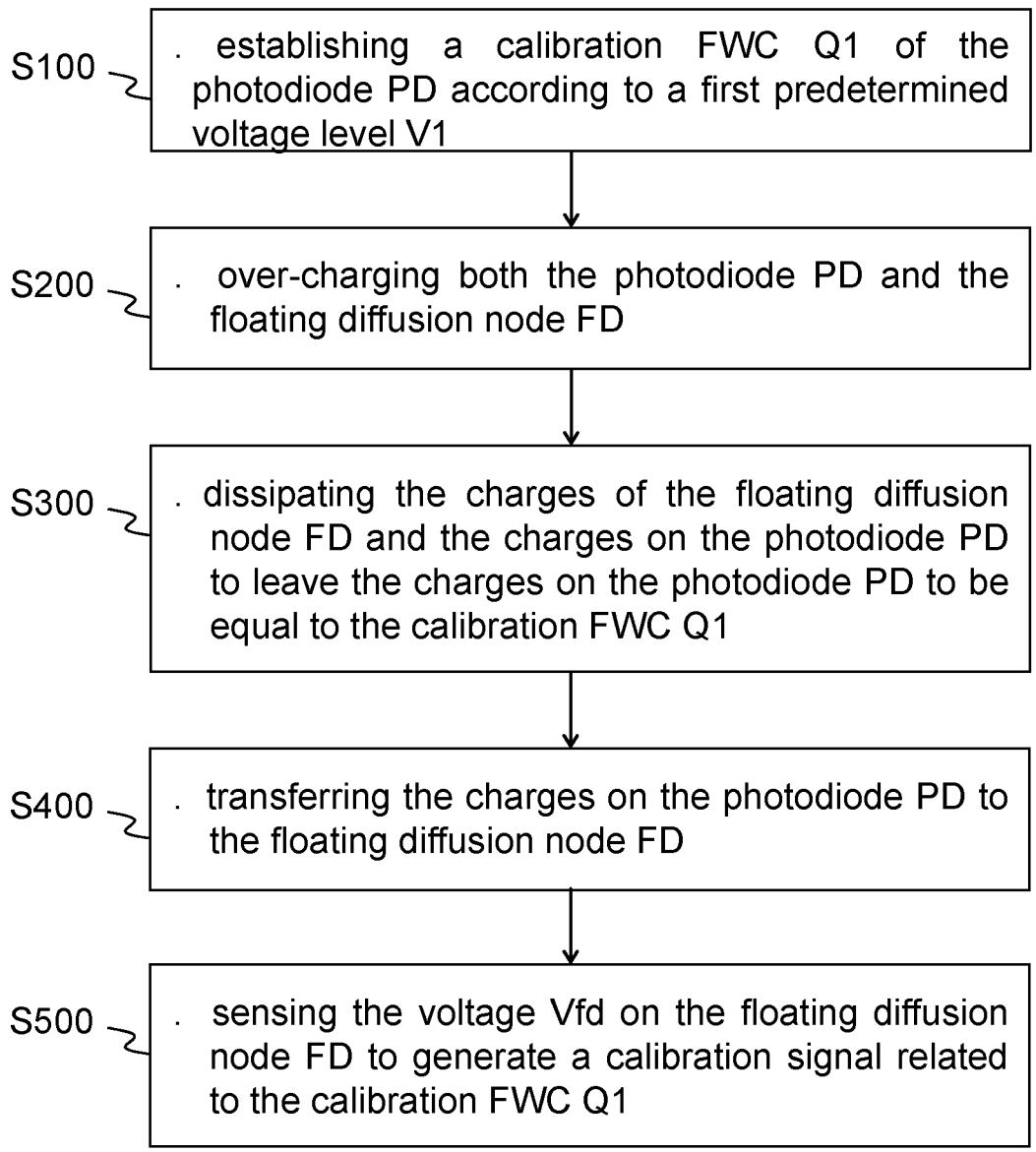
FIG. 5A shows a flow chart of one embodiment of the method according to the present invention.

FIG. 5A shows a flow chart of one embodiment of the method according to the present invention. In one embodiment, during a calibration mode, a calibration signal can be generated by performing the steps shown in FIG. 5A, and accordingly, a calibrated image signal according to a raw image signal and the calibration signal can be obtained during a normal imaging process. As shown in FIG. 5A, during the calibration mode, the method comprises:

S100: establishing a calibration full-well capacity (FWC) Q1 of the photodiode PD according to a first predetermined voltage level V1;

S200: over-charging both the photodiode PD and the floating diffusion node FD;

S300: dissipating at least a portion of the charges of the floating diffusion node FD and at least a portion of the charges on the photodiode PD so that the charges on the photodiode PD are substantially equal to the calibration FWC Q1;

S400: transferring the charges on the photodiode PD to the floating diffusion node FD; and S500: sensing the voltage Vfd on the floating diffusion node FD to generate a calibration signal related to the calibration full-well capacity Q1.

Figure 5B:
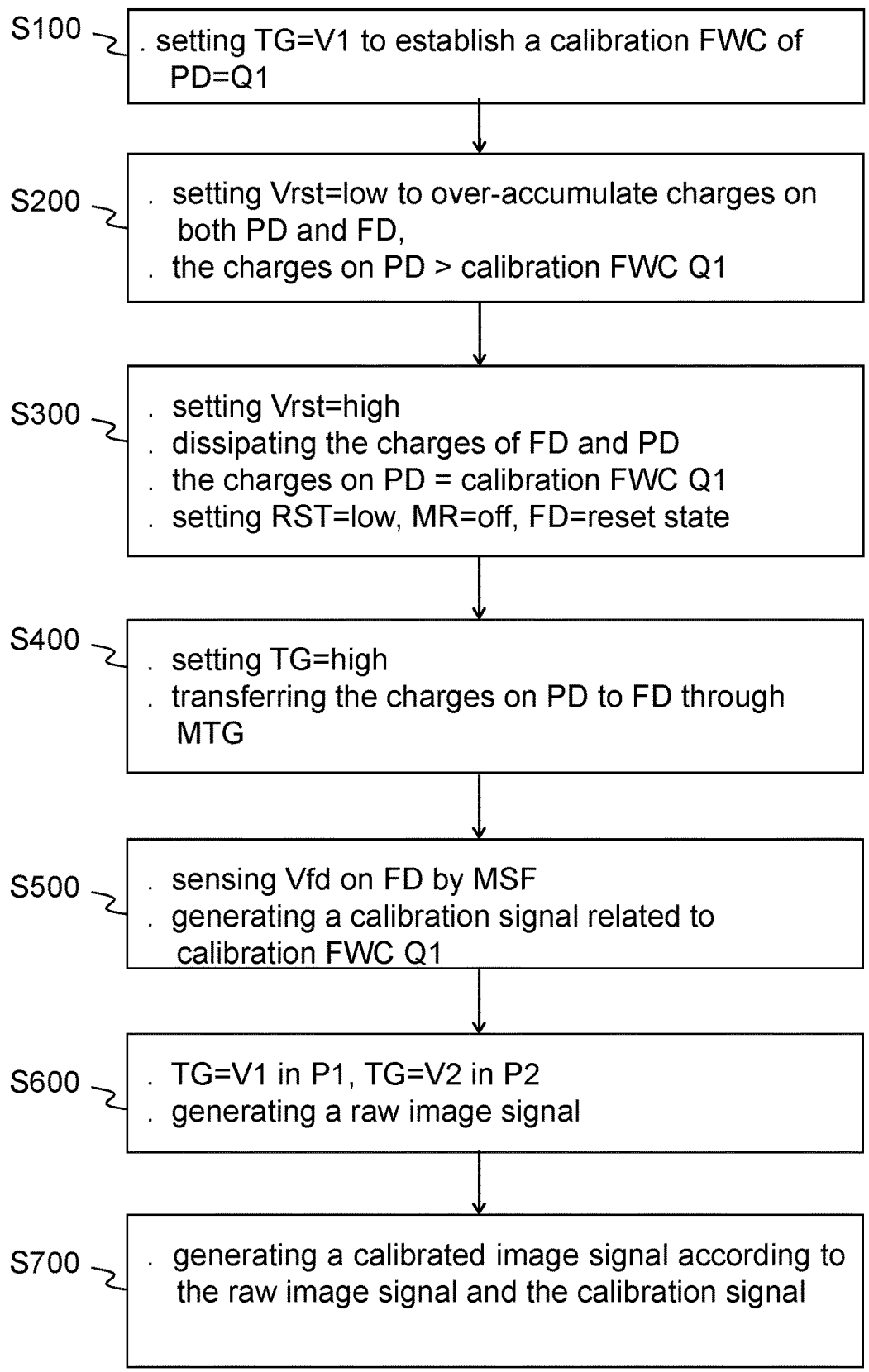
FIG. 5B shows a flow chart of one specific embodiment of the method according to the present invention.
Figure 6:
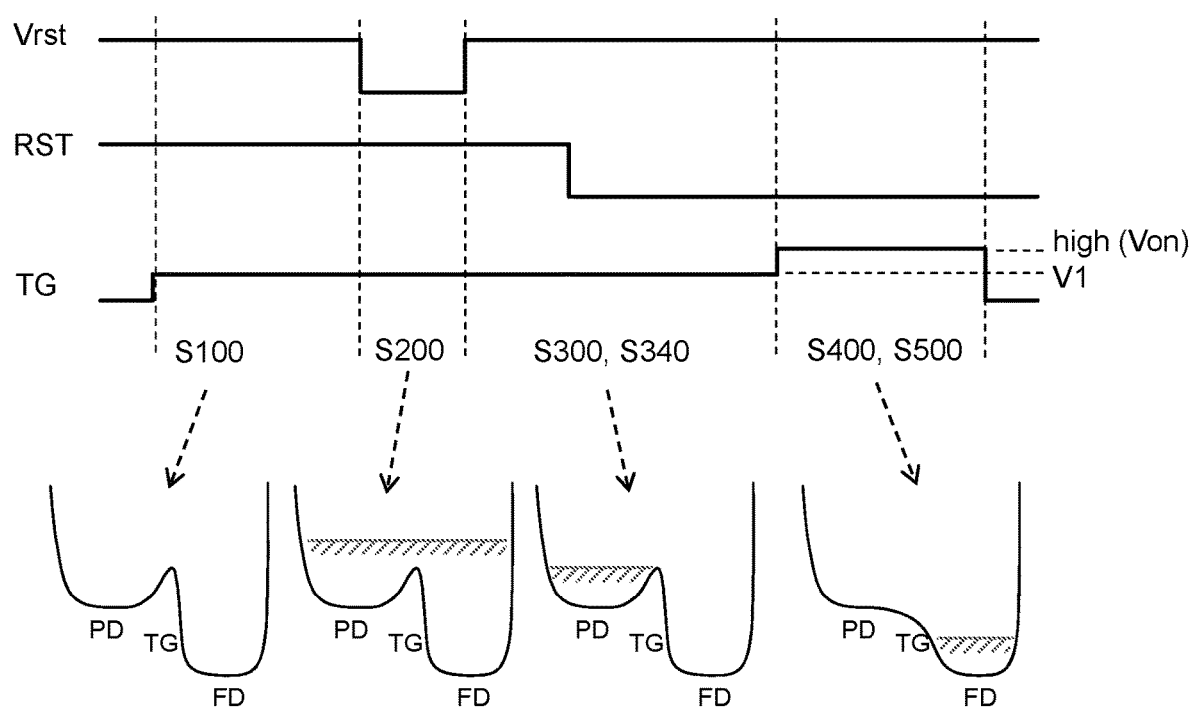
FIG. 6 shows a timing chart and a corresponding potential diagram corresponding to FIG. 5B.

FIG. 5B shows a flow chart of one specific embodiment of the method according to the present invention. FIG. 6 shows a timing chart and a corresponding potential diagram corresponding to FIG. 5B. As shown in FIG. 5B and FIG. 6, in this embodiment, during the calibration mode, the following steps are performed:

S100: setting the transfer signal TG to a first predetermined voltage level V1 to establish a calibration full-well capacity (FWC) Q1 of the photodiode PD;

S200: setting the reset voltage Vrst to a low level to over-accumulate charges on both the photodiode PD and the floating diffusion node FD, wherein the charges over-accumulated on the photodiode PD are higher than the calibration full-well capacity Q1;

S300: setting the reset voltage Vrst to a high level to dissipate at least a portion of the charges of the floating diffusion node FD and at least a portion of the charges on the photodiode PD, so that the charges on the photodiode PD are substantially equal to the calibration full-well capacity Q1, and thereafter setting the reset signal RST to a low level to turn off the reset transistor MR;

S400: setting the transfer signal TG to a high level to transfer the charges on the photodiode PD to the floating diffusion node FD through the transfer transistor MTG; and S500: sensing the voltage Vfd on the floating diffusion node FD by the buffer transistor MSF to generate a calibration signal related to the calibration full-well capacity Q1.

Note that, in one embodiment, in the step S400, the high level is high to an extent which is sufficient to transfer all the charges on the photodiode PD to the floating diffusion node through the transfer transistor MTG, as shown in the potential diagram illustrating step S400 in FIG. 6.

In one embodiment, the first predetermined voltage level V1 of the transfer signal TG is higher than a low level (e.g. Voff for turning off the transfer transistor MTG) of the transfer signal TG, and is lower than a high level (e.g. a level for fully transferring the charges from the photodiode PD to the floating diffusion node FD) of the transfer signal TG.

Figure 7:
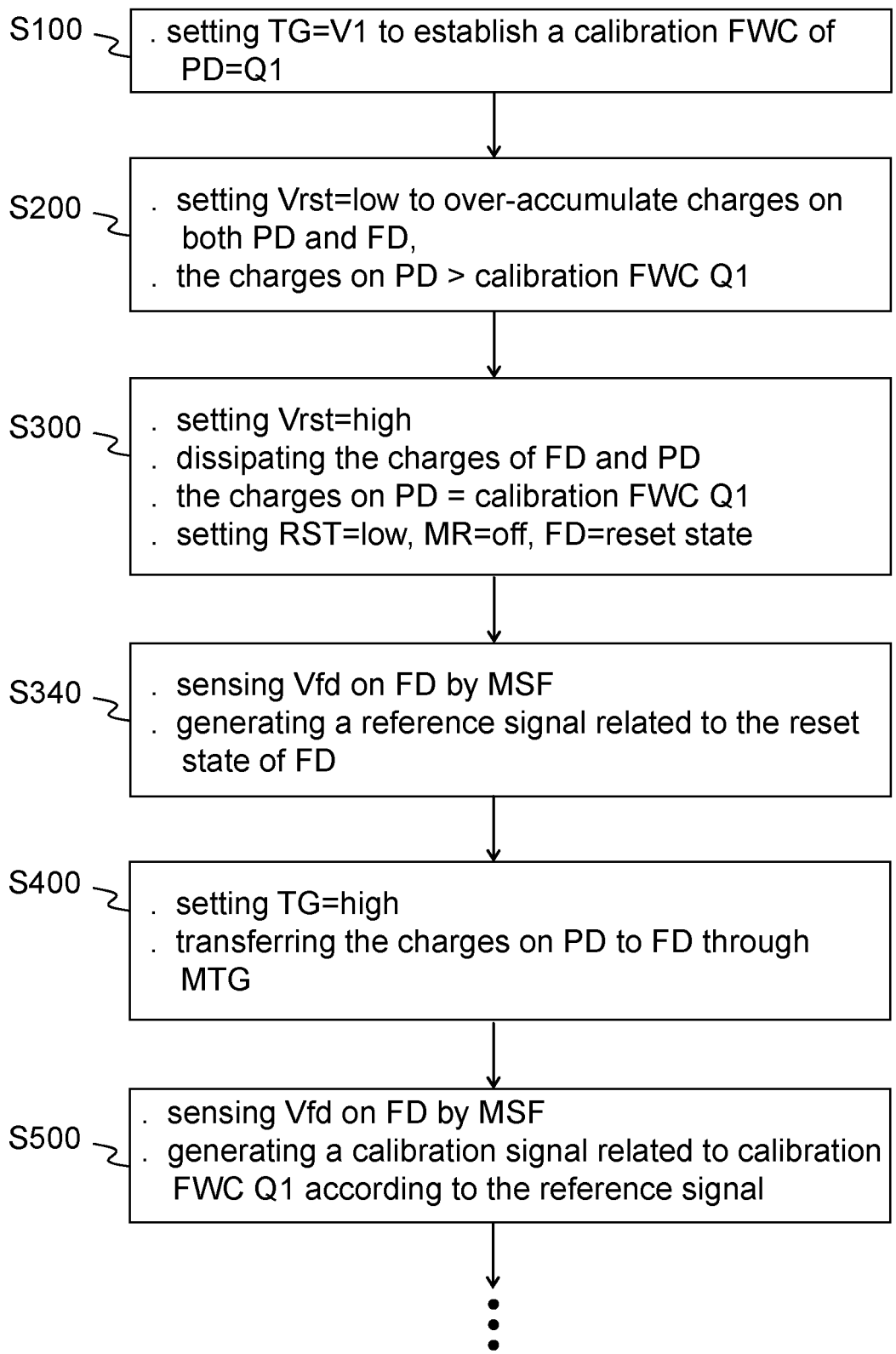
FIG. 7 shows a flow chart of one embodiment of the method according to the present invention.

FIG. 7 shows a flow chart of one embodiment of the method according to the present invention. The embodiment shown in FIG. 7 is similar to the embodiment shown in FIG. 5B (for simplicity, steps S600 and S700 are not shown in FIG. 7), but further includes the step S340. Referring to FIG. 6 and FIG. 7, in this embodiment, during the calibration mode, the method further includes:

S340: after the step S300 and before the step S400, sensing the voltage Vfd on the floating diffusion node FD by the buffer transistor MSF to generate a reference signal related to a reset state of the floating diffusion node FD. In this embodiment, the step S500 (as shown in FIG. 7) further includes: generating the calibration signal further according to the reference signal so that the calibration signal is correlated to the reset state of the floating diffusion node FD.

Figure 8:
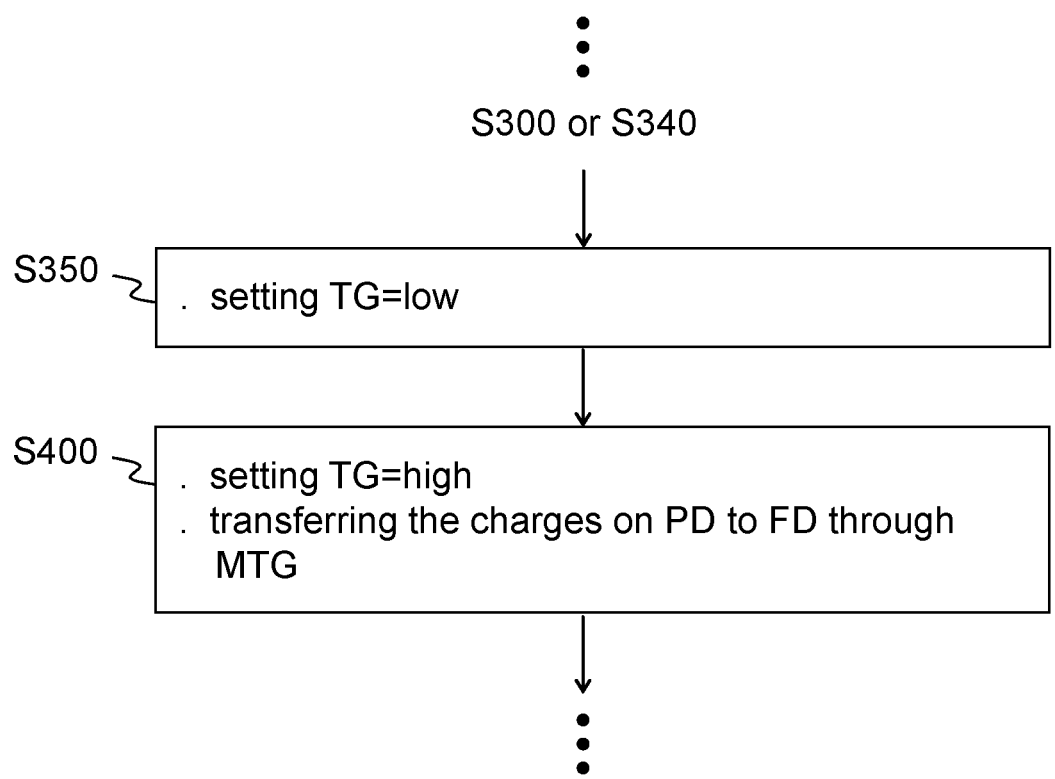
FIG. 8 shows a flow chart of one embodiment of the method according to the present invention.
Figure 9:
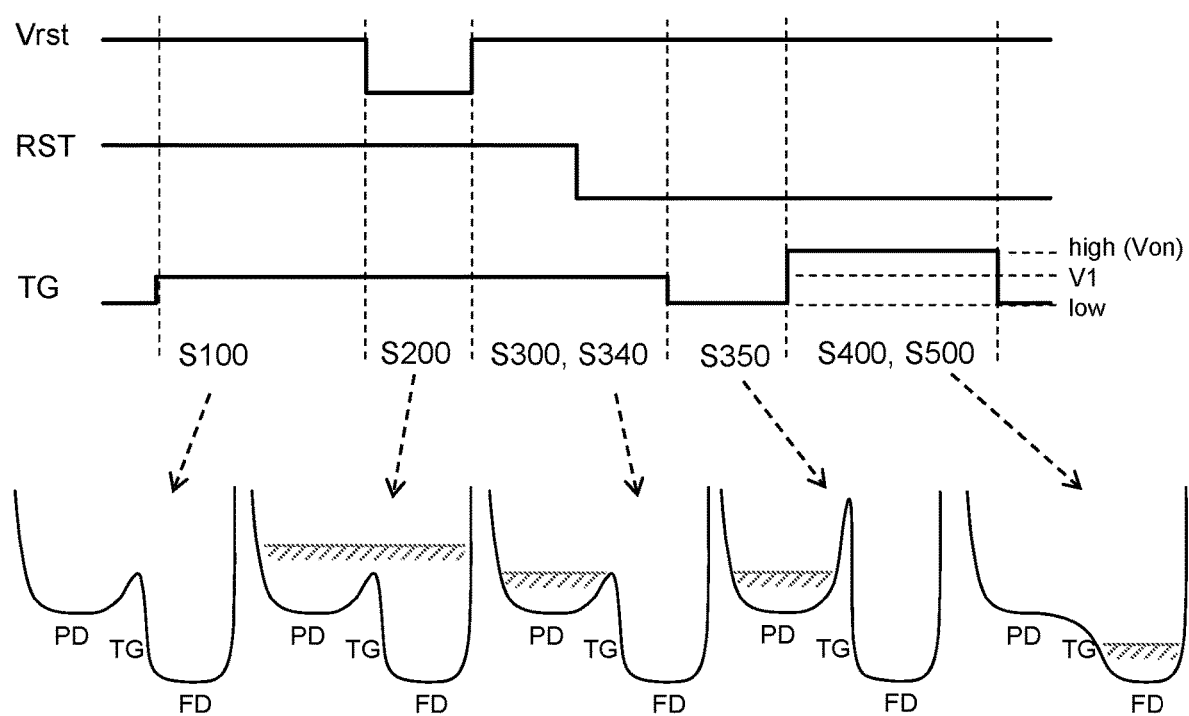
FIG. 9 shows a timing chart and a corresponding potential diagram corresponding to FIG. 8.

FIG. 8 shows a flow chart of one embodiment of the method according to the present invention. FIG. 9 shows a timing chart and a corresponding potential diagram corresponding to FIG. 8. The embodiments shown in FIG. 8 and FIG. 9 are similar to the embodiments shown in FIG. 5B and FIG. 6 (for simplicity, steps S100-S300/S340 and S500-S700 are not shown in FIG. 7), but further includes the step S350. As shown in FIG. 8 and FIG. 9, in this embodiment, during the calibration mode, the method further comprises:

S350: before step S400, setting the transfer signal TG to a low level. When the transfer signal TG is set to a low level (e.g. Voff), the corresponding full-well capacity of the photodiode PD reaches the maximum possible FWC Qoff. Note that, in one embodiment, the reference signal can alternatively be generated after step S400, i.e. after the transfer signal TG is set to a low level. In this case, the operation conditions for generating the reference signal are closer to the operation conditions when sensing an image.

Still referring to FIG. 5B, in one embodiment, the method of the present invention further comprises:

S600: generating a raw image signal by the pixel circuit by setting the transfer signal TG to the first predetermined voltage level V1 during a first portion P1 of the integration period and to a second voltage level (for example Voff) during a second portion P2 of the integration period; and S700: generating a calibrated image signal according to the raw image signal and the calibration signal.

Figure 1:
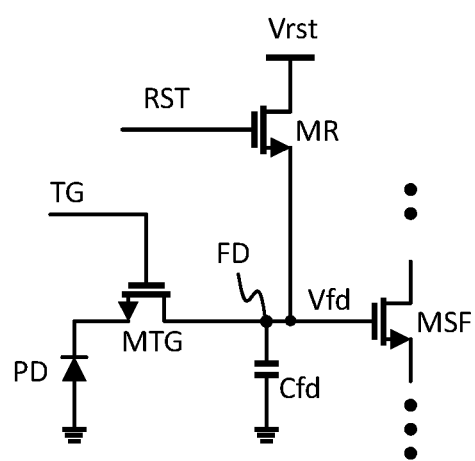
FIG. 1 shows a typical pixel circuit of a MOS imager circuit.
Figure 2:
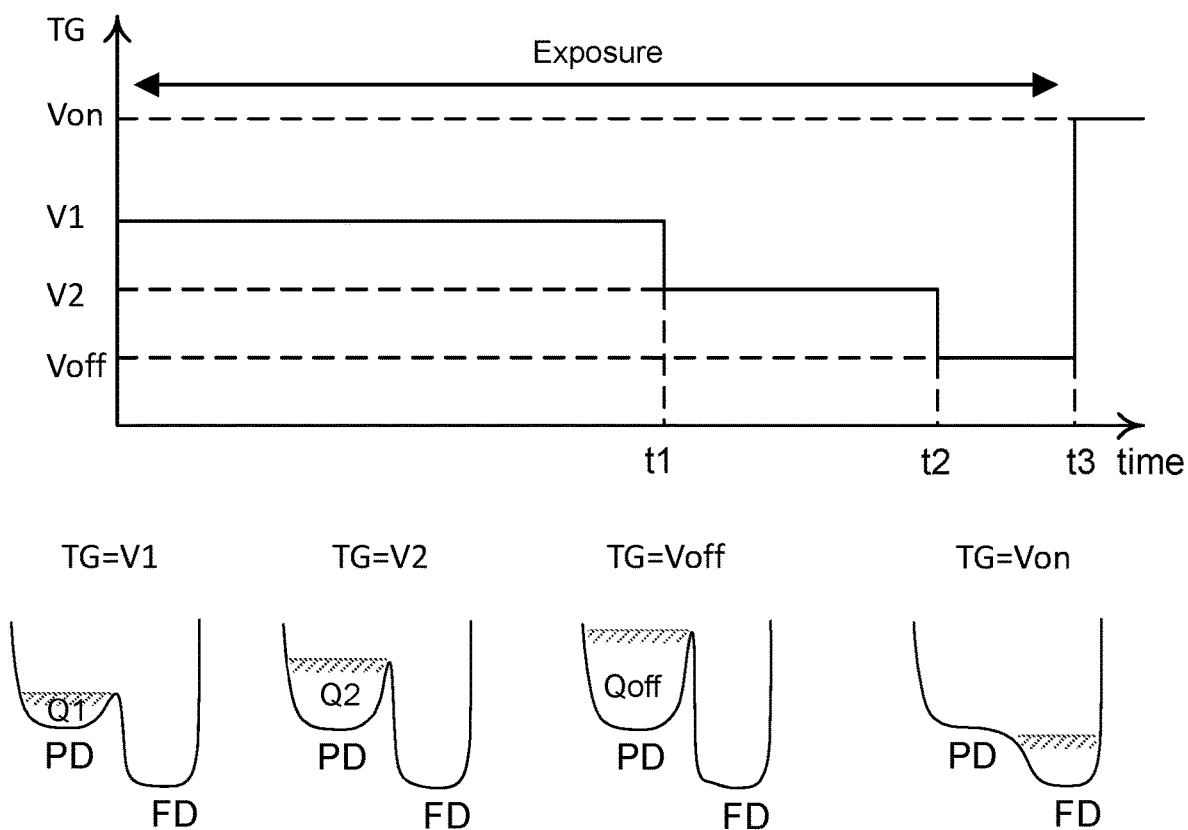
FIG. 2 shows a non-linear voltage-to-light transfer function corresponding to plural transfer signals of the transfer signal of an HDR pixel circuit according to the present invention.
Figure 3A:
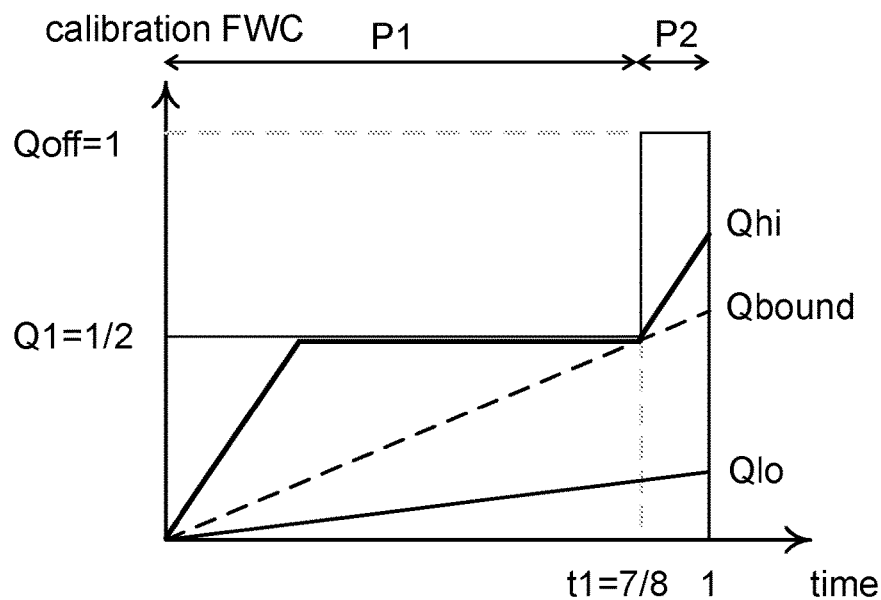
FIG. 3A shows a timing diagram of employing plural calibration full-well capacities of an HDR imager circuit to yield a typical non-linear voltage-to-light transfer function.
Figure 3B:
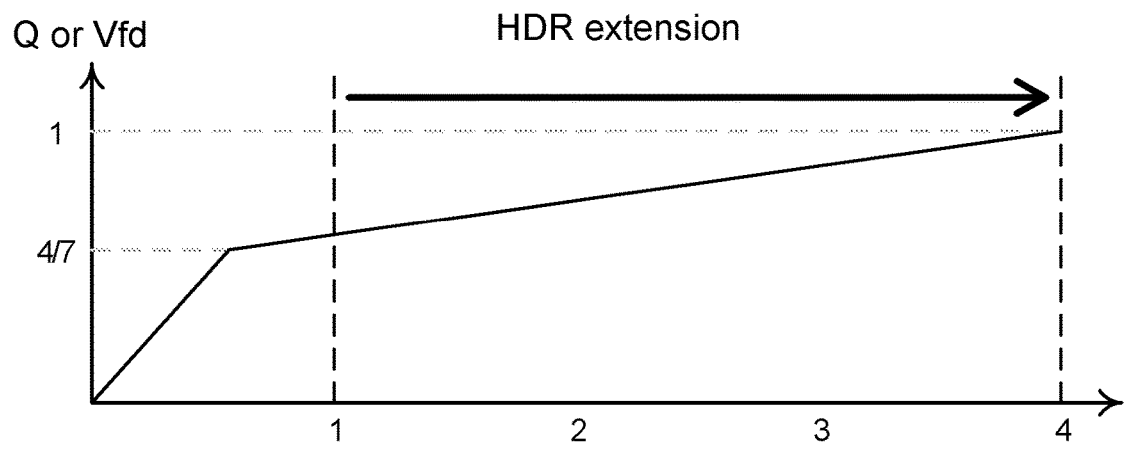
FIG. 3B shows a non-linear voltage-to-light (or charges Q-to-light) transfer function corresponding to FIG. 3A.
Figure 4A:
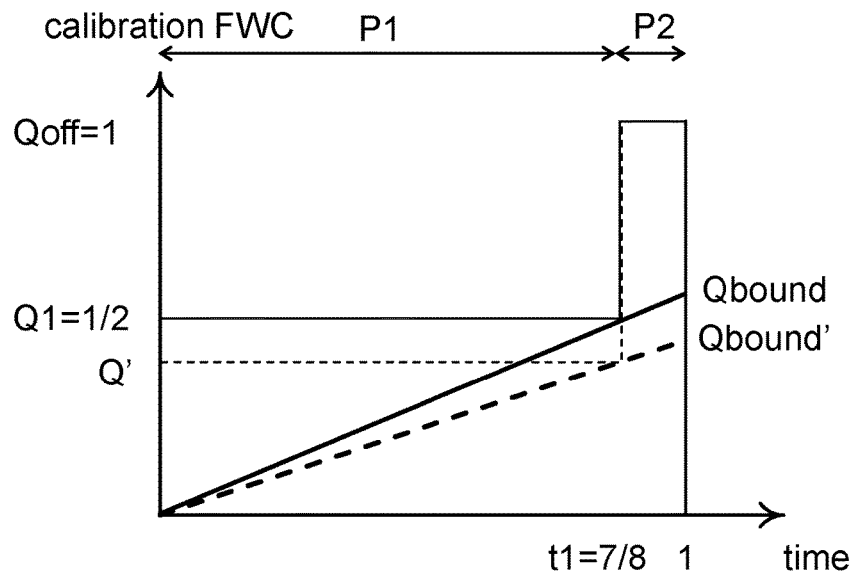
FIG. 4A shows an ideal and a non-ideal calibration full-well capacities with the same transfer signal.
Figure 4B:
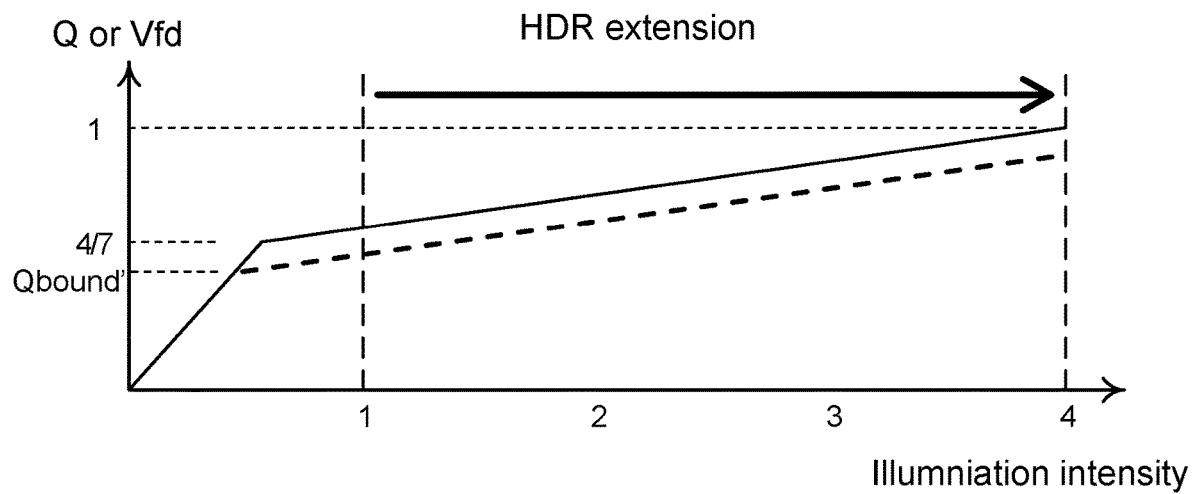
FIG. 4B shows an ideal and a non-ideal voltage-to-light transfer functions.

In this embodiment, steps 600 and 700 operate the pixel circuit 100 to capture an image with the non-linear voltage-to-light transfer function for example shown in FIG. 4B which is defined by the voltage levels V1 and Voff of the transfer signal TG. Since the FWC of the photodiode PD has been sensed during the calibration mode to generate the calibration signal, the raw image signal can be calibrated by the calibration signal to obtain a calibrated image signal which achieves HDR, high precision and low noise simultaneously.

Figure 10A:
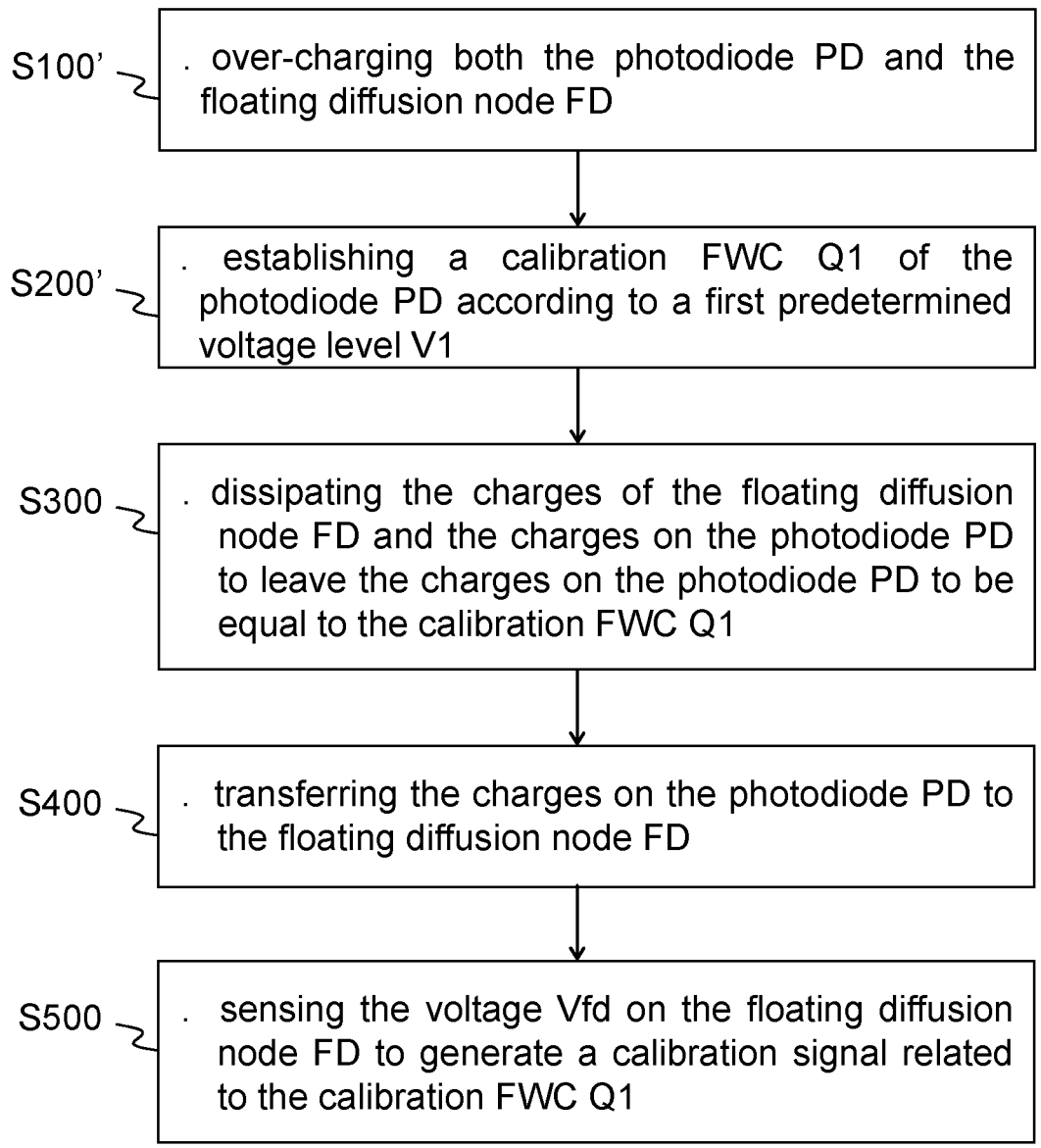
FIG. 10A shows a flow chart of another embodiment of the method according to the present invention.

FIG. 10A shows a flow chart of another embodiment of the method according to the present invention. In one embodiment, during a calibration mode, a calibration signal can be generated by performing the steps shown in FIG. 10A, and accordingly, a calibrated image signal according to a raw image signal and the calibration signal can be obtained during a normal imaging process. As shown in FIG. 10A, during the calibration mode, the method comprises:

S100': over-charging both the photodiode PD and the floating diffusion node FD; and S200': establishing a calibration FWC Q1 of the photodiode PD according to a first predetermined voltage level V1.

The other steps S300, S400 and S500 are the same as the steps of the embodiment shown in FIG. 5A, so their explanations are not repeated herein.

This embodiment shown in FIG. 10A is similar to the embodiment shown in FIG. 5A, but is different in that in this embodiment, the charges are over-accumulated before the calibration FWC Q1 is established, which still can achieve the desired calibration effect.

Figure 10B:
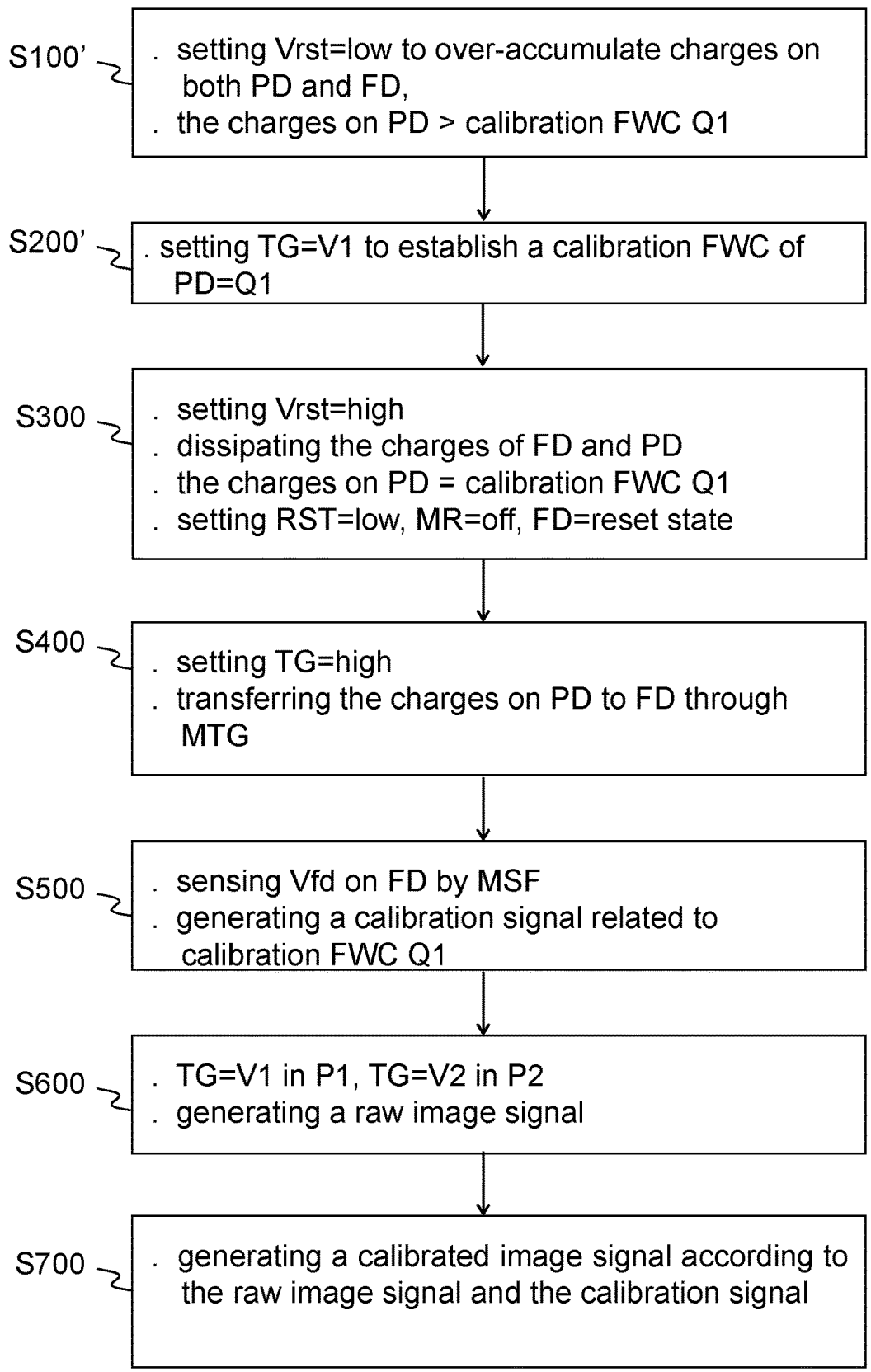
FIG. 10B shows a flow chart of one specific embodiment of the method according to the present invention.
Figure 11:
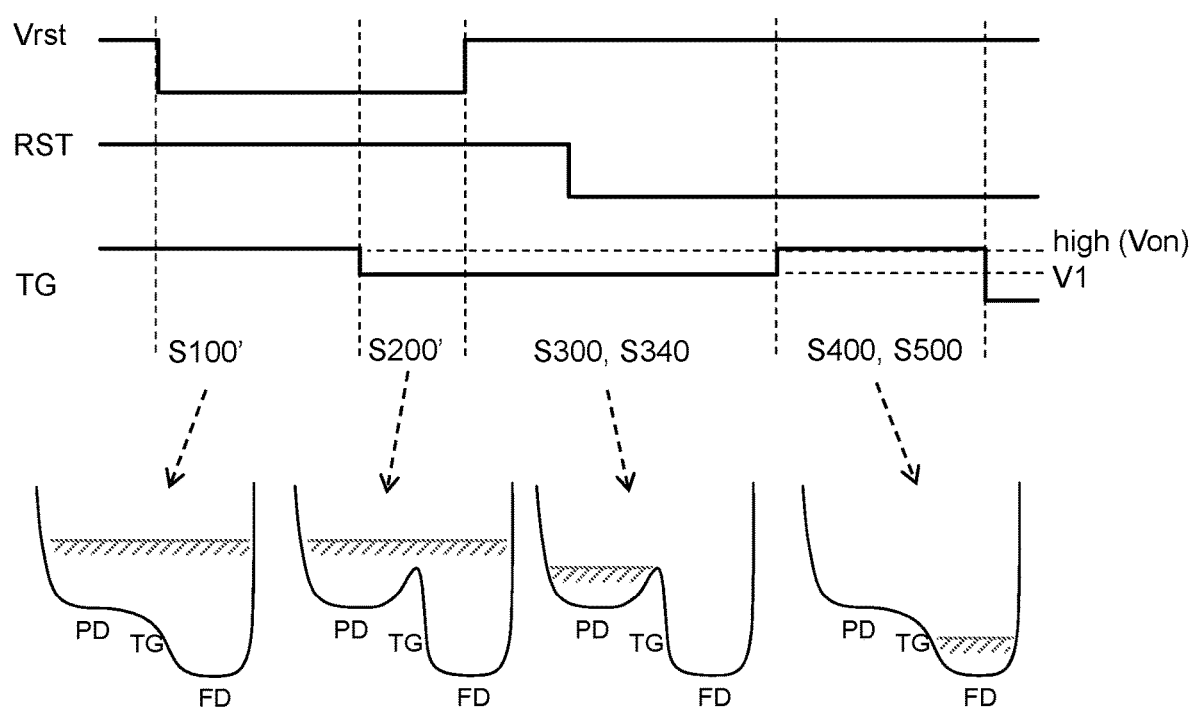
FIG. 11 shows a timing chart and a corresponding potential diagram corresponding to FIG. 10B.

FIG. 10B shows a flow chart of one specific embodiment of the method according to the present invention. FIG. 11 shows a timing chart and a corresponding potential diagram corresponding to FIG. 10B. As shown in FIG. 10B and FIG. 11, in this embodiment, during a calibration mode, the following steps are performed:

S100': setting the transfer signal TG to a high level and setting the reset voltage Vrst to a low level to over-accumulate charges on both the photodiode PD and the floating diffusion node FD, wherein the charges over-accumulated on the photodiode PD are higher than a calibration full-well capacity Q1 of the photodiode PD. Note that, in another embodiment, in step S100', the transfer signal TG can be set to a random level between Von and Voff, since the main purpose of this step is to over-charges both the photodiode PD and the floating diffusion node FD.

S200': setting the transfer signal TG to a first predetermined voltage level V1 to establish the calibration full-well capacity Q1.

S300: setting the reset voltage Vrst to a high level to dissipate at least a portion of the charges of the floating diffusion node FD and at least a portion of the charges on the photodiode PD, so that the charges on the photodiode PD are substantially equal to the calibration full-well capacity Q1, and thereafter setting the reset signal RST to a low level (e.g. Voff) to turn off the reset transistor MR so that the floating diffusion node FD is configured to a reset state;

S400: setting the transfer signal TG to a high level (e.g. the level of the power of the pixel circuit) to transfer the charges on the photodiode PD to the floating diffusion node FD through the transfer transistor MTG; and S500: sensing the voltage Vfd on the floating diffusion node FD by the buffer transistor MSF to generate a well-capacity signal related to the calibration full-well capacity Q1, and generating a calibration signal according to the well-capacity signal.

Figure 12:
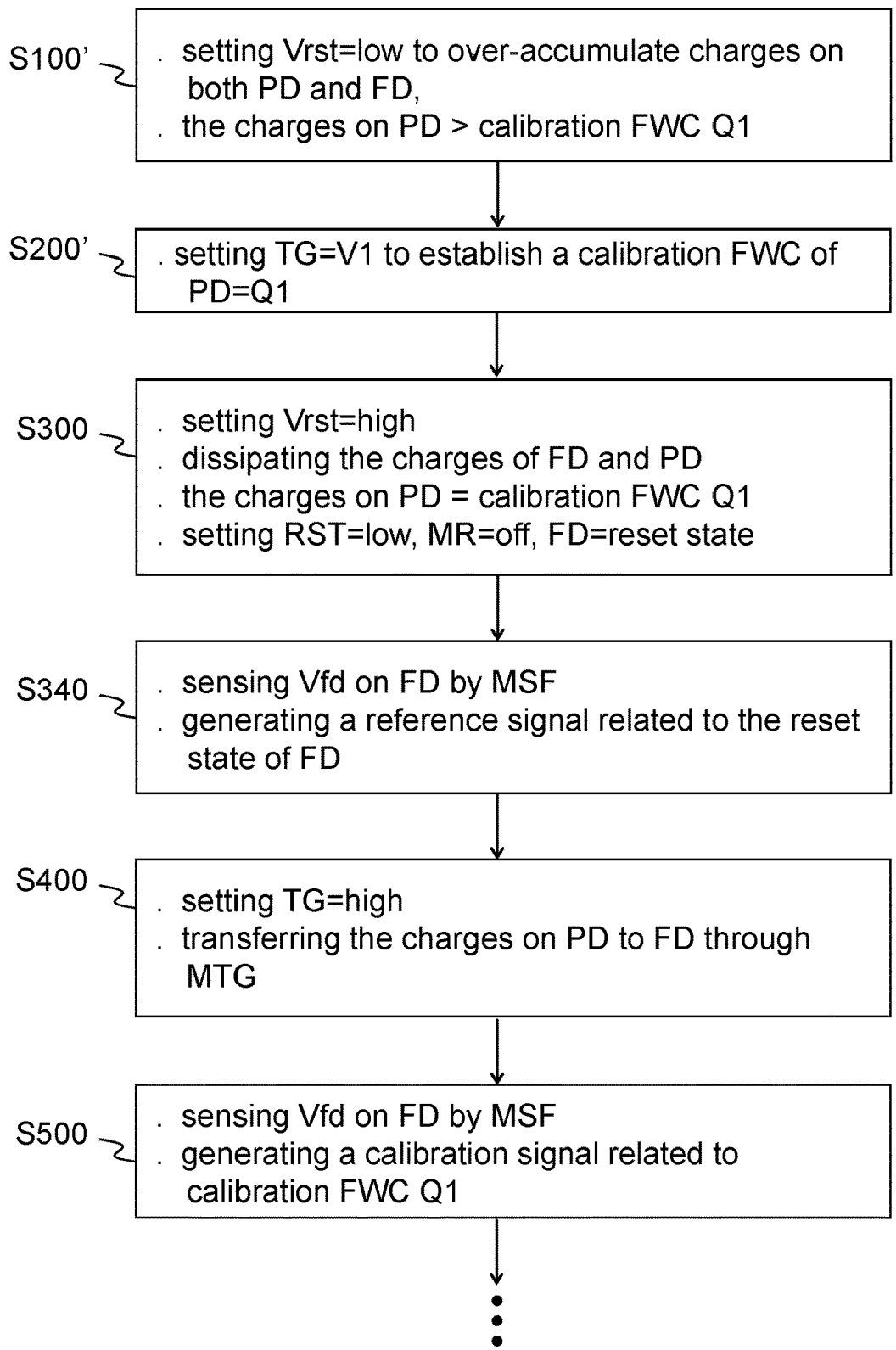
FIG. 12 shows a flow chart of one specific embodiment of the method according to the present invention.
Figure 13:
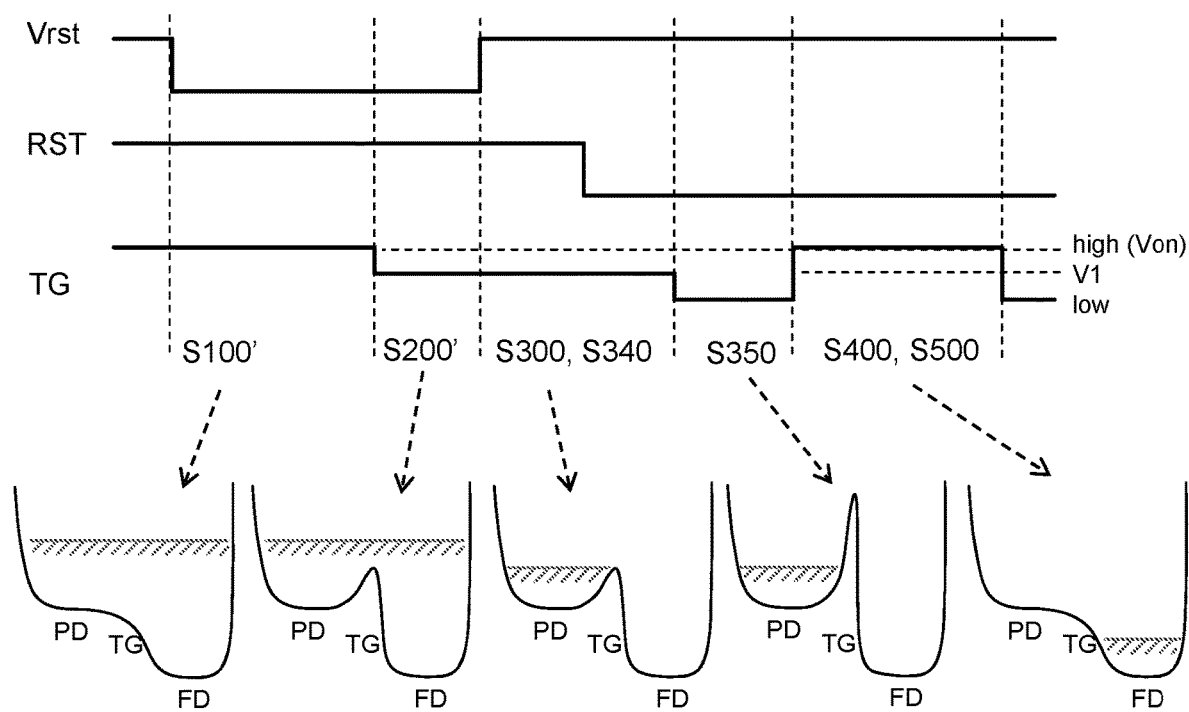
FIG. 13 shows a timing chart and a corresponding potential diagram.

FIG. 12 and FIG. 13 further show steps S340 and S350 corresponding to the embodiment shown in FIG. 10B. The detailed operations of steps S340 and S350 in the embodiment shown in FIG. 12 and FIG. 13 are the same as the corresponding steps of the embodiments shown in FIG. 7, FIG. 8 and FIG. 9, and their explanations are not repeated herein.

Figure 14:
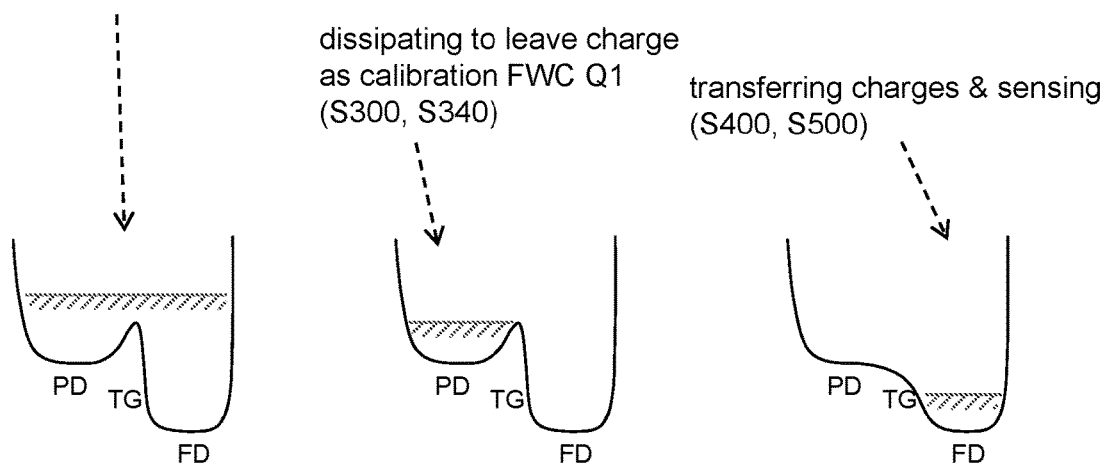
FIG. 14 shows a simplified potential diagram according to the method of the present invention.

FIG. 14 shows a simplified potential diagram according to the method of the present invention. As shown in FIG. 14, the method can be simplified and summarized into 3 potential diagrams. In the first potential diagram (from left to right), an FWC Q1 according to V1 is established and overcharged. Note that, as described in the embodiments hereinbefore, the order of the steps of establishing the FWC Q1 and over-charging can be swapped. In the second potential diagram, at least a portion of the charges of PD are dissipated so that the charges remaining on PD are substantially equal to the FWC Q1. In the third potential diagram, the charges on PD are transferred to FD for reading.

Note that, in one embodiment, the steps of the method of the present invention are performed according to the order of the steps listed in the embodiments described and illustrated hereinbefore. However, this is not for limiting the scope of the present invention. It should be considered within the scope of the present invention as long as the FWC corresponding to a predetermined voltage level is sensed for calibration.

Note that, due to imperfection of components and/or imperfection of operations, a desired result may not be perfectly obtained, so the term "substantially" is used in this specification to express that an insignificant error within a tolerable range is acceptable.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A method of operating an HDR pixel circuit, wherein the pixel circuit includes: a photodiode, configured to operably accumulate charges generated by a photocurrent of the photodiode during an integration period; a transfer transistor, controlled by a transfer signal, wherein a first electrode of the transfer transistor is coupled to the photodiode and a second electrode of the transfer transistor is coupled to a floating diffusion node; a reset transistor, controlled by a reset signal, wherein a first electrode of the reset transistor is coupled to a reset voltage and a second electrode of the reset transistor is coupled to the floating diffusion node; and a buffer transistor, configured to operably sense a voltage on the floating diffusion node; the method comprising, during a calibration period, steps of:

S100: establishing a calibration full-well capacity of the photodiode according to a first predetermined voltage level;

S200: over-charging both the photodiode and the floating diffusion node at the same time through the reset transistor by controlling the reset voltage and the reset signal;

S300: dissipating charges of the floating diffusion node and charges on the photodiode at the same time through the reset transistor by controlling the reset voltage and the reset signal to leave the charges on the photodiode to be substantially equal to the calibration full-well capacity;

S400: transferring the charges on the photodiode to the floating diffusion node; and S500: sensing the voltage on the floating diffusion node to generate a calibration signal for calibrating the calibration full-well capacity corresponding to the first predetermined voltage level.

2. The method of claim 1, wherein:

the step S100 includes: setting the transfer signal to the first predetermined voltage level to establish the calibration full-well capacity of the photodiode;

the step S200 includes: setting the reset voltage to a low level to over-accumulate charges on both the photodiode and the floating diffusion node, wherein the charges over-accumulated on the photodiode are higher than the calibration full-well capacity;

the step S300 includes: setting the reset voltage to a high level to dissipate at least a portion of the charges of the floating diffusion node and at least a portion of the charges on the photodiode, so that the charges on the photodiode are substantially equal to the calibration full-well capacity, and thereafter setting the reset signal to a low level to turn off the reset transistor;

the step S400 includes: setting the transfer signal to a high level to transfer the charges on the photodiode to the floating diffusion node through the transfer transistor; and the step S500 includes: sensing the voltage on the floating diffusion node by the buffer transistor to generate the calibration signal related to the calibration full-well capacity.

3. The method of claim 2, further comprising:

S350: before S400, setting the transfer signal to a low level.

4. The method of claim 2, wherein in the step S400, the high level is high to an extent which is sufficient to transfer all the charges on the photodiode to the floating diffusion node through the transfer transistor.

5. The method of claim 2, wherein the first predetermined voltage level of the transfer signal is higher than the low level of the transfer signal and is lower than the high level of the transfer signal.

6. The method of claim 1, further comprising:

S600: generating a raw image signal by the pixel circuit by setting the transfer signal to the first predetermined voltage level during a first portion of the integration period and to a second voltage level during a second portion of the integration period; and S700: generating a calibrated image signal according to the raw image signal and the calibration signal.

7. The method of claim 1, further comprising:

S340: after the step S300 and before the step S400, sensing the voltage on the floating diffusion node by the buffer transistor to generate a reference signal related to the reset state of the floating diffusion node;

wherein the step S500 further includes: generating the calibration signal further according to the reference signal.

8. The method of claim 1, further comprising:

performing the steps according to the listed order of the steps.

9. A method of operating an HDR pixel circuit, wherein the pixel circuit includes: a photodiode, configured to operably accumulate charges generated by a photocurrent of the photodiode during an integration period; a transfer transistor, controlled by a transfer signal, wherein a first electrode of the transfer transistor is coupled to the photodiode and a second electrode of the transfer transistor is coupled to a floating diffusion node; a reset transistor, controlled by a reset signal, wherein a first electrode of the reset transistor is coupled to a reset voltage and a second electrode of the reset transistor is coupled to the floating diffusion node; and a buffer transistor, configured to operably sense a voltage on the floating diffusion node; the method comprising, during a calibration period, steps of:

S100': over-charging both the photodiode and the floating diffusion node at the same time through the reset transistor by controlling the reset voltage and the reset signal;

S200': establishing a calibration full-well capacity of the photodiode according to a first predetermined voltage level;

S300: dissipating charges of the floating diffusion node and charges on the photodiode at the same time through the reset transistor by controlling the reset voltage and the reset signal to leave the charges on the photodiode to be substantially equal to the calibration full-well capacity;

S400: transferring the charges on the photodiode to the floating diffusion node; and S500: sensing the voltage on the floating diffusion node to generate a calibration signal for calibrating the calibration full-well capacity corresponding to the first predetermined voltage level.

10. The method of claim 9, wherein:

the step S100' includes: setting the transfer signal to a high level and setting the reset voltage to a low level to over-accumulate charges on both the photodiode and the floating diffusion node, wherein the charges over-accumulated on the photodiode are higher than the calibration full-well capacity of the photodiode;

the step S200' includes: setting the transfer signal to the first predetermined voltage level to establish the calibration full-well capacity;

the step S300 includes: setting the reset voltage to a high level to dissipate at least a portion of the charges of the floating diffusion node and at least a portion of the charges on the photodiode, so that the charges on the photodiode are substantially equal to the calibration full-well capacity, and thereafter setting the reset signal to a low level to turn off the reset transistor;

the step S400 includes: setting the transfer signal to a high level to transfer the charges on the photodiode to the floating diffusion node through the transfer transistor; and the step S500 includes: sensing the voltage on the floating diffusion node by the buffer transistor to generate the calibration signal related to the calibration full-well capacity.

11. The method of claim 10, further comprising:
S350: before S400, setting the transfer signal to a low level.

12. The method of claim 10, wherein in the step S400, the high level is high to an extent which is sufficient to transfer all the charges on the photodiode to the floating diffusion node through the transfer transistor.

13. The method of claim 10, wherein the first predetermined voltage level of the transfer signal is higher than the low level of the transfer signal and is lower than the high level of the transfer signal.

14. The method of claim 9, further comprising:
S600: generating a raw image signal by the pixel circuit by setting the transfer signal to the first predetermined voltage level during a first portion of the integration period and to a second voltage level during a second portion of the integration period; and
S700: generating a calibrated image signal according to the raw image signal and the calibration signal.

15. The method of claim 9, further comprising:
S340: after the step S300 and before the step S400, sensing the voltage on the floating diffusion node by the buffer transistor to generate a reference signal related to the reset state of the floating diffusion node;
wherein the step S500 further includes: generating the calibration signal further according to the reference signal.

16. The method of claim 9, further comprising:
performing the steps according to the listed order of the steps.

* * * * *